Aug. 30, 1932.                P. A. NOME                 1,874,205
                       DIFFERENTIAL PRESSURE GAUGE
                    Filed Nov. 26, 1930    2 Sheets-Sheet 1
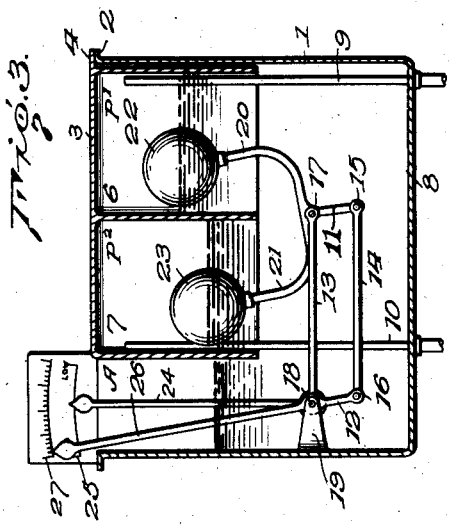
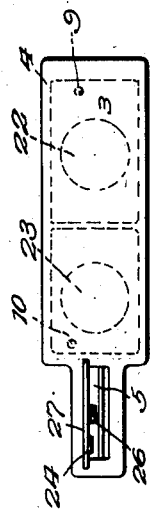
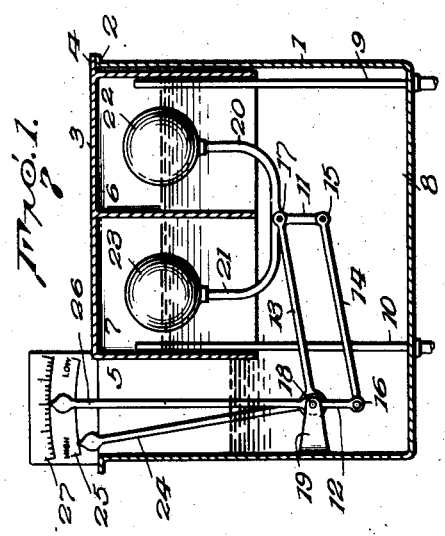
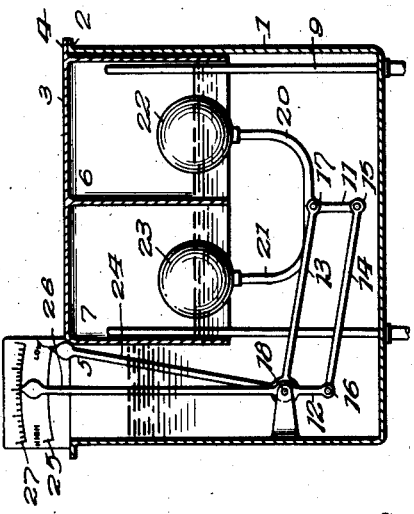
Inventor
Peter A. Nome,
By K. P. McElroy
            Attorney

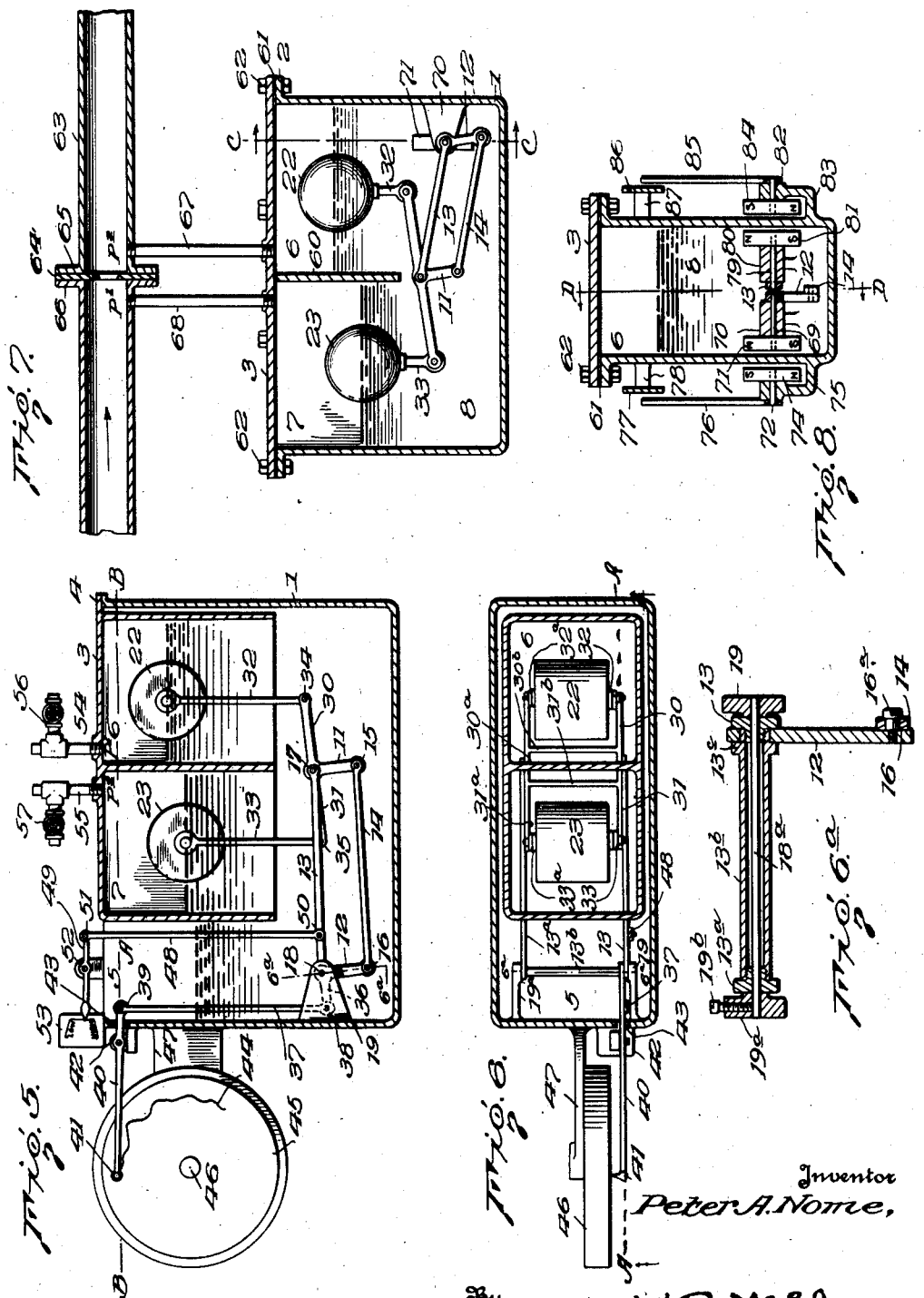

Patented Aug. 30, 1932

1,874,205

UNITED STATES PATENT OFFICE

PETER A. NOME, OF BROOKLYN, NEW YORK, ASSIGNOR TO THE PERMUTIT COMPANY, OF NEW YORK, N. Y., A CORPORATION OF DELAWARE

DIFFERENTIAL PRESSURE GAUGE

Application filed November 26, 1930. Serial No. 498,452.

This invention relates to differential pressure gauges; and it comprises means of measuring fluid pressure differences or fluid flows wherein changing heights of a manometer liquid responding to fluid pressure differences cause movement of floats on the manometer liquid columns to different elevations, the two floats being both attached in the manometer liquid to one side of a parallelogram formed of links connected by turnable joints and the pressure-responsive movements of the floats being transmitted through angular movement of the parallelogram links to indicating pointers attached to other sides of the parallelogram; all as more fully hereinafter set forth and as claimed.

In the art of measuring fluid pressures, gas pressures in particular, the manometer is in common use. Communication of two different pressures to two columns of liquid in communication is a simple matter, but accurate reading of resulting differences between the liquid levels in the two columns is not so simple. For reading purposes various devices have been used. Floats upon the liquid in the manometer columns with various types of mechanically connected devices indicating the float movements are not uncommon, but the mechanical transmission of float movement usually involves more or less resistance to such movement, resulting in lost motion and inaccuracy of registration. Many of the prior devices take a choice between lost motion and friction.

It is an object of the present invention to effect improvement in means for measuring fluid pressures in general and in particular small pressure differences occurring in fluid flows such as the flow of gases through stacks of boilers, kilns and other furnaces, ventilating, air heating and cooling systems and the like. Among the special uses of the invention are determinations of gas pressure losses such as those occurring in gas flow through the fuel beds of boilers and other furnaces and the pressure loss through a gas filter in order to show when cleaning of the filter is in order. These pressure differences are often of a small order of magnitude and the consequent liquid level differences are small. In the present invention these differences are, so to speak, magnified for reading purposes.

I have found that the movement of floats in two manometer columns responding to differential pressures applied to the two columns is readily and accurately shown by indicating pointers when the two floats are connected beneath the liquid level to one side of a parallelogram formed of four links connected by pivoted joints and the indicating pointer arms which may extend above the liquid level are attached to other sides of the submerged parallelogram; the indicating arms being provided with pointers and scales by which the movement of the arms and the corresponding pressure differences are read. The connection between the floats and the parallelogram is such that motion of the floats causes angular changes in the parallelogram and it is these angular changes which actuate the indicating arms in direct response to the float motion resulting from pressure changes. By making the manometer tubes and the floats sufficiently large, the energy of the float motion is correspondingly large and the resistance of the link parallelogram to angular changes therein becomes relatively negligible. One of the two manometer tubes may be open to the atmosphere or the manometer may have a third column open to the atmosphere. By placing in this open column two indicating arms attached to two continguous or adjacent sides of the parallelogram I effect indication not only of the differential elevations of the two floats but also of their similar and equal or common movements, such movements as result from changes in the absolute pressure applied to the two float columns and from changes in the total quantity of liquid in the manometer. The pressures indicated may be either superatmospheric or subatmospheric. At any moment the positions of the floats are indicated by the positions of the pointers on their respective scales and, if desired, writing points may be placed on the indicating arms in conjunction with properly calibrated charts attached to clock movements in known ways, and then the indicating arm positions may be recorded in terms of pressures, the gauge thus serving to record as well as to indicate pressure differences.

In the accompanying drawings I have shown more or less diagrammatically structures within the invention.

Figure 1 is an elevation, partly in cross section, of an indicating differential pressure gauge, the gauge being shown with a relatively high level of liquid therein;

Figure 2 is the same view as that of Figure 1 of the gauge with a relatively low level of liquid therein;

Figure 3 is the same view as that of Figures 1 and 2 of the gauge with the liquid level intermediate those of Figures 1 and 2 and with differential pressures applied;

Figure 4 is a top plan view of a structure similar to that of Figures 1 to 3;

Figure 5 is an elevation partly in cross section of a modified indicating gauge adapted to act as a recording gauge, the section being along the line A—A of Figure 6;

Figure 6 is a plan view also showing a cross section along line B—B of Figure 5;

Figure 6a is a detail in vertical cross section along the line 6a—6a of Figure 6;

Figure 7 is an elevation partly in cross section of a further modified gauge, the section being along the line D—D of Figure 8;

Figure 8 is an elevation partly in cross section along the line C—C of Figure 7.

Referring first to Fig. 1, a container for the manometer liquid is designated by the numeral 1. The container has a flanged top 2 upon three sides of which is attached cover 3 by means of counterflange 4. Cover 3 has depending vertical walls dividing the container into three chambers 5, 6 and 7, the walls extending part way down through the container and leaving the three chambers in communication at the bottom. Chambers 6 and 7 have closed tops and chamber 5 is open to the atmosphere. The container is partly filled with a suitable manometer liquid 8 which may be water, oil, mercury, etc. as may be desired. The quantity of manometer liquid in the container is sufficient to reach well above the bottom of the chamber walls and thus to form, as shown, three liquid columns. Two pipes 9 and 10 lead into chambers 6 and 7 respectively near their tops for the purpose of communicating to these chambers the pressures to be measured. Beneath the liquid in the container is placed a parallelogram formed of the links 11, 12, 13 and 14 joined by turnable joints 15, 16, 17 and 18, the shaft of joint 18 being turnably supported in bracket 19 attached to the container wall. The link 11 has two projections or rigid extensions 20 and 21 to which floats 22 and 23 are attached. Projections 20 and 21 extend at right angles to the axis of link 11 and in the plane of the parallelogram. The floats 22 and 23 float on the liquid in chambers 6 and 7 respectively and partly support the weight of the links. Attached to the link 13 and at right angles to the axis of this link is an indicating pointer arm 24 adapted to move back and forth as link 13 is moved angularly in joint 18, such movement being responsive to change in the average height of floats 22 and 23, as illustrated by the different liquid heights shown in Figs. 1, 2 and 3. Common changes in the height of the two floats move the pointer of indicating arm 24 across the scale 25 and the averaged height of the two floats is indicated by the position of the pointer on the scale 25. A longitudinal extension of link 12 forms the indicating pointer arm 26 which is placed to indicate on a scale 27 the difference between the heights of the two floats as illustrated in Fig. 3. The two scales 25 and 27 can be calibrated to read in any desired units such as inches of liquid column.

In operation, as shown in Fig. 3, a difference between the pressures P1 and P2, applied to chambers 6 and 7 through pipes 9 and 10, causes the liquid in these two chambers to assume different levels and thus causes floats 22 and 23 to be moved to different elevations. This differential float movement causes the link 11 to turn in joint 17 and thus causes an angular change in the parallelogram formed by links 11, 12, 13 and 14. Link 12, being always parallel to link 11 follows link 11 in its movement and the indicator arm 26, which is an extension of link 12, moves its pointer across the scale 27, the position of the pointer being an exact reflection of the difference in elevation of the two floats. If either of the chambers 6 and 7 is under atmospheric pressure, the reading of any difference of pressure in the two chambers is in terms of pressure either above or below atmospheric. Such an arrangement is useful for purposes such as measuring chimney and stack drafts and pressures in air ventilating conduits and the like.

If the average level of the liquid in chambers 6 and 7 changes then there is a common change in the elevations of the two floats and such a common change causes only a vertical movement of the link 11 as can be seen by a comparison of Figs. 1 and 2. Due to the parallelogram arrangement, link 12 is always parallel to link 11 and the vertical movement of link 11 causes no angular movement of link 12 and consequently the indicating arm 26 will not be moved by a common change in the liquid level of chambers 6 and 7. Such a common change in liquid level, however, causes the links 13 and 14 to turn. Link 13 turns in joint 18 and such angular movement of link 13 is a measure of the common change in the liquid level of chambers 6 and 7, and is indicated by the pointer 24 on the scale 25. Changes in the position of pointer 24 can be read as changes in the total quantity of liquid in the container, such changes as, for example, result from evaporation or loss of the manometer liquid. In other cases, with a known and constant volume of manometer liquid, by a proper calibration of the scale 25 the position of the pointer arm 24 can be made to indicate changes in the average pressure applied to chambers 6 and 7 relative to the atmospheric pressure of chamber 5, that is, the average of P1—A and P2—A (Fig. 3). When indicator 24 is to be used for the purpose of indicating losses of liquid from the container, it is advantageous to have the relative size of chamber 5 considerably smaller than that of chambers 6 and 7 as illustrated in Fig. 4. This reduces any error of reading causable by changes of the average absolute pressure in chambers 6 and 7.

Referring now to Figs. 5 and 6, in the modification of structure here shown, the link 11 has two projections 30 and 31 at right angles to its axis. The ends of these projections are connected to rods 32 and 33 by means of turnable joints 34 and 35. The other ends of rods 32 and 33 are attached to the floats 22 and 23 respectively. Link 12 has an extension 36 forming a right angle with the link axis and the end of this extension is connected by means of rod 37 and turnable joints 38 and 39 with one end of indicating arm 40 which carries a suitable writing point 41 on its other end. The arm 40 is turnably mounted as shown at 42 on an external bracket on the container 1 and moves in a slot 43 in the container wall. The writing point 41 makes a chart record 44 of the pressure differences in chambers 6 and 7 as communicated by changes in the differential height of floats 22 and 23 turning link 11 and link 12 to actuate connecting rod 37 and indicating arm 40, the record being made on the chart 45 which is turnable by a clock movement 46 mounted on the bracket 47 attached to container 1. A rod 48 connects the link 13 by means of the turn joints 50 and 51 to one end of a pointer 49. The pointer 49 is turnably mounted on the bracket 52 attached to the container and is actuated by angular movement of link 13 in response to common changes of the liquid levels in chambers 6 and 7, indicating these changes on the scale 53. The structure may be made more rigid and sidewise motion of the floats prevented by providing two links 13 and 13a. Link 13 is connected to link 11 shaped as shown in Fig. 5, whereas link 13a is turnably connected to a link formed by two arms 30a and 31a the ends of which are turnably connected by rods 32a and 33a to the ends of the cylindrical floats 22 and 23 opposite to the ends to which rods 32 and 33 are fastened. The projections 30 and 31 are rigidly connected with the arms 30a and 31a by means of spacers 30b and 31b. Referring to Fig. 6a, the links 13 and 13a have threaded projections which are rigidly connected by means of the tubular spacer 13b. The links 13 and 13a are turnably mounted on shaft 18a which is supported by the brackets 19 and 19a and held in place by means of the set screw 19b. The link 12 is turnably mounted on spacer 13b and held in place by the ring 13c formed on spacer 13b. The turn joint 16 is formed by the shoulder screw 16a which is fastened to link 12 and permits free turning of link 14 on link 12. In this modification as shown the chambers 6 and 7 have pressure connections 54 and 55 with side outlet cocks 56 and 57. The area of chamber 5 may be made relatively small as in the gauge illustrated by Fig. 4.

In operation, the modified gauge of Figs. 5 and 6 acts similarly to that of Figs. 1 to 4. The pressure differences in chambers 6 and 7 are indicated by the position of pointer 41 and, if desired, are recorded on chart 45. Common changes of the liquid levels in chambers 6 and 7 are indicated by pointer 49 on scale 53 whether such common changes are the result of a loss of liquid from the manometer or of changes in the average pressure in chamber 6 and 7 relative to the pressure in chamber 5. In most cases, and particularly when the manometer liquid, for example, water, has an appreciable vapor pressure, it will be desirable to know the quantity of liquid in the container. This quantity is indicated accurately when the same pressure is applied to the chambers 5, 6 and 7. Equality of pressure is attained by opening the cocks 56 and 57 and exposing chambers 6 and 7 to atmospheric pressure. So doing, the position of pointer 49 on the scale 53 indicates any change in the quantity of liquid occurring since a previous checking. This procedure also permits a checking of the zero setting of pointer 41 and can be carried out occasionally for this latter purpose. Similar checking can, of course, be used with the gauge of Figs. 1 to 4 either by removing cover 3 occasionally or by providing air cocks in pipes 9 and 10.

Referring to Figs. 7 and 8 the modified gauge here shown is adapted to measure differences between two pressures which are greatly different from atmospheric pressure. This modification is especially adapted for use as a flow meter in conjunction with a Venturi tube or orifice plate or the like. The container 1 has a wall 60 extending part way to the bottom and dividing the container into the two chambers 6 and 7. The cover 3 is attached by means of bolts and nuts 62 to the flange 2 and interposed gasket 61. The fluid, the rate of flow of which is to be measured, flows through the pipe 63 in which an orifice plate 64 is inserted between two flanges 65 and 66. The pressure P—1 on the up-stream side of the orifice plate is communicated to the chamber 7 by means of the pipe 68 and the pressure P—2 on the downstream side of the orifice plate 64 is communicated to chamber 6 by means of the pipe 67. The link parallelogram 11, 12, 13, 14 is supported as before on a bracket 70 and link 11 has extensions at right angles connected by rods 32 and 33 to floats 22 and 23 on the liquid. Link 12 has a shaft attachment 69 which carries near the wall of the container a magnet 71. On the outside of the container adjacent to magnet 71 is a magnet 74 attached to a shaft 72 which is supported in the bearing 75 formed in a bracket attached to container 1. Since the magnets 71 and 74 tend to remain parallel with their respective north and south poles adjacent to each other, angular movements of link 12 are transmitted through the wall of the container to the shaft 72 and this shaft is provided with a pointer 76 indicating the pressure difference P—1 minus P—2. This pressure difference may be read on a scale 77 which is attached to a bracket 78 on the container wall. If desired, the scale 77 may be calibrated in terms of rate of flow. The parallelogram link 13 may be attached to a shaft 79 supported, co-axially to shaft 72, in a bearing 80 and carrying near the wall of the container a magnet 81. Adjacent to magnet 81 on the outside of the container may be a magnet 84 attached to a shaft 82 which is supported in the bearing 83. A pointer 85 attached to shaft 82 serves to indicate the level of the manometer liquid 8 in the container by means of a scale 86 attached to a bracket 87 on the container wall.

The gauge of Figs. 7 and 8 is well suited to measure differences in pressure of gases or gas mixtures. It is also adapted to measure the pressure of liquids and in this case the manometer liquid 8 must be heavier than the liquid the pressure of which is to be measured and the floats 22 and 23 are made so that they float on the liquid 8 and sink in the liquid communicating pressure to the gauge. The liquid 8 must be such that it does not mix with the liquid communicating pressure to chambers 6 and 7. For example, when measuring the pressure of water, mercury and heavy oils are suitable manometer liquids. If desired this gauge may be turned upside down and in that event the manometer liquid should be of lower specific gravity than the liquid communicating the pressure in chambers 6 and 7 and the floats 22 and 23 should be made to float on the latter liquid and sink in the former. In this modification, light oil or even air or other gases may be used as manometer fluid 8.

As materials of construction, cast iron, brass or aluminum or galvanized pressed steel are suitable materials for the container. Brass rods or stampings or aluminum die castings may be used for the links and the indicating arms. When water is used as the manometer liquid, the shafts of the turnable joints are advantageously made of incorrodible iron and steel alloys such, for example, as an alloy containing 18 per cent chromium and 8 per cent nickel. The floats may be made of electrically deposited copper or of brass or aluminum drawn or spun into the desired shape or of molded "bakelite". When using the magnetic transmission illustrated in Figs. 7 and 8, the use of relatively large bodies of iron or steel in making the parts is to be avoided. It is desirable that chambers 6 and 7 be of ample size to accommodate floats large enough to provide ample energy for actuation of the angular changes in the parallelogram. This permits accurate measurement of small pressure differences, giving positive indicating and recording action with a minimum of lost motion. With proper construction of the turnable joints, friction is negligible.

What I claim is:

1. A differential pressure gauge comprising a liquid manometer, two floats on respective liquid columns in the manometer, an angularly variable parallelogram in the liquid and formed of four links connected by pivoted joints, one of the links having two projections respectively connected with the two floats and adapted to impart angular movement to this link in response to differential vertical movement of the floats and means connected with the opposite and parallel link adapted to indicate said responsive angular movement.

2. In a liquid manometer pressure gauge, means for indicating differences in the heights of the manometer liquid columns which comprises two floats on the liquid columns, four links supported in the liquid by the floats and connected by pivoted joints to form a parallelogram having variable angles, one of the links forming one side of the parallelogram having two projections opposite each other and in the plane of the parallelogram with respective connections between these projections and the floats, and an indicating arm movable by the link forming the opposite and parallel side of the parallelogram.

3. A pressure gauge comprising a liquid manometer having two floats on respective liquid columns, and in the body of the liquid a parallelogram of angularly movable links connected by pivoted joints, one of the vertical links of said parallelogram having projections connected to said floats, the opposite and parallel vertical link being extended above the surface of the liquid and forming an indicating pointer arm.

4. A pressure gauge comprising a liquid manometer having two floats on respective liquid columns, and in the body of the liquid a parallelogram of angularly movable links connected by pivoted joints, one of the vertical links of said parallelogram having projections connected to said floats, the opposite and parallel vertical link being extended above the surface of the liquid and forming an indicating pointer arm and an adjacent horizontal link having a projection extending above the liquid and forming another indicating pointer arm.

5. A pressure gauge comprising a liquid manometer having two floats on respective liquid columns, and in the body of the liquid a parallelogram of angularly movable links connected by pivoted joints, one of the vertical links of said parallelogram having projections connected to said floats, the opposite and parallel vertical link having a projection connected to an indicating pointer arm above the surface of the liquid.

6. A pressure gauge comprising a liquid manometer having two floats on respective liquid columns, and in the body of the liquid a parallelogram of angularly movable links connected by pivoted joints, one of the vertical links of said parallelogram having projections connected to said floats, the opposite and parallel vertical link having a projection connected to an indicating pointer arm above the surface of the liquid and an adjacent horizontal link being connected to another indicating pointer arm above the liquid surface.

7. A pressure gauge comprising a liquid manometer having three liquid column chambers, one of the chambers being open to the atmosphere, the other two being closed and adapted to receive pressure to be measured, floats on the liquid in the latter two chambers, a parallelogram formed by angularly movable links supported in the liquid by said floats and adapted to be actuated by the floats in angular changes responsive to changes in the pressures on the closed chambers and means connected to the links of the parallelogram for indicating said angular changes, said means comprising two indicating arms extending above the liquid level in the open chamber.

8. A differential pressure gauge comprising two liquid columns, two floats on said liquid columns, an angularly variable parallelogram formed of four links connected by pivoted joints, one of the links having projections connected with the two floats, the two floats being thereby adapted to impart angular movement to this link in response to differential vertical movement of the floats and means actuated by movement of the opposite and parallel link adapted to indicate said responsive angular movement.

9. A pressure gauge comprising a liquid manometer having three liquid column chambers, one of the chambers being open to the atmosphere, the other two being closed and adapted to receive pressures to be measured, floats on the liquid in the latter two chambers, a parallelogram formed by angularly movable links supported in the liquid by said floats and adapted to be actuated by the floats in angular changes responsive to changes in the pressures on the closed chambers and means connected to a link of the parallelogram for indicating said angular changes, said means comprising an indicating arm extending above the liquid level in the open chamber.

10. A differential pressure gauge comprising two liquid columns, floats on said liquid columns, an angularly movable parallelogram formed by four links connected by pivoted joints, one of the links having projections connected with the floats and adapted to impart angular movement to the parallelogram in response to movement of the floats and means actuated by movement of the links for indicating the extent of said float movement.

11. A differential pressure gauge comprising two liquid columns, floats on said liquid columns, an angularly movable parallelogram formed by four links connected by pivoted joints, one of the links having projections connected with the floats and adapted to impart angular movement to the parallelogram in response to movement of the floats and means actuated by movement of the links for indicating the extent of said float movement, said means including a magnet attached to a link of the parallelogram and another magnet actuated by movement of the first magnet.

In testimony whereof, I have hereunto affixed my signature.

PETER A. NOME.